United States Patent [19]

Rydbeck

[11] Patent Number: 5,778,322
[45] Date of Patent: Jul. 7, 1998

[54] METHOD AND APPARATUS FOR CONTROLLING TRANSCEIVER OPERATIONS IN A RADIO COMMUNICATIONS SYSTEM TO REDUCE SAME CHANNEL FREQUENCY INTERFERENCE

[75] Inventor: Nils Rutger Rydbeck, Cary, N.C.

[73] Assignee: Ericsson Inc., Research Triangle Park, N.C.

[21] Appl. No.: 516,254

[22] Filed: Aug. 17, 1995

Related U.S. Application Data

[63] Continuation of Ser. No. 93,076, Jul. 16, 1993, abandoned.

[51] Int. Cl.⁶ .................................................. H04Q 7/22
[52] U.S. Cl. ........................ 455/558; 455/561; 455/454
[58] Field of Search ........................... 379/58, 59, 357; 455/33.1, 33.4, 34.1, 56.1, 186.1, 558–561, 422, 426, 454–450; H04Q 7/22

[56] References Cited

U.S. PATENT DOCUMENTS

| | | | |
|---|---|---|---|
| 4,748,655 | 5/1988 | Thrower et al. | 379/58 |
| 4,903,322 | 2/1990 | Inahara et al. | 455/56 |
| 4,905,305 | 2/1990 | Garner et al. | 455/186.1 |
| 4,989,230 | 1/1991 | Gillig et al. | 379/59 |
| 5,001,775 | 3/1991 | Hayashi et al. | 455/186.1 |
| 5,020,130 | 5/1991 | Grube et al. | 455/9 |
| 5,040,238 | 8/1991 | Comroe et al. | 455/33.1 |
| 5,048,059 | 9/1991 | Dent | 375/94 |
| 5,091,942 | 2/1992 | Dent | 380/46 |
| 5,127,042 | 6/1992 | Gillig et al. | 379/59 |
| 5,134,717 | 7/1992 | Rasmussen | 455/89 |
| 5,153,919 | 10/1992 | Reeds, III et al. | 380/44 |
| 5,260,988 | 11/1993 | Schellinger et al. | 379/59 |
| 5,262,769 | 11/1993 | Holmes | 455/186.1 |
| 5,321,844 | 6/1994 | Lemson | 455/67.1 |
| 5,335,276 | 8/1994 | Thompson et al. | 380/21 |
| 5,353,332 | 10/1994 | Raith et al. | 379/59 |
| 5,367,558 | 11/1994 | Gillig et al. | 379/59 |
| 5,428,668 | 6/1995 | Dent et al. | 379/59 |

FOREIGN PATENT DOCUMENTS

| | | |
|---|---|---|
| 0280196 A2 | 8/1988 | European Pat. Off. |
| 0538933 A1 | 4/1993 | European Pat. Off. |
| 2225512 | 5/1990 | United Kingdom |
| 2260468 | 4/1993 | United Kingdom |

OTHER PUBLICATIONS

*Mobile TDMA Dual Mode Digital Cellular Telephone*, CEL/NA 9012 7–92, Technical Manual, Ericsson GE Mobile Communications, 1992, pp. 1-1 through 1-22.

*I and Q Modulators for Cellular Communications Systems*, D. E. Norton et al., Microwave Journal, vol. 34, No. 10, Oct. 1991, pp. 63–79.

*Advanced Mobile Phone Service*, F. H. Blecher, IEEE Transactions on Vehicular Technology, vol. VT-29, No. 2, May 1980, pp. 238–244.

*Primary Examiner*—Thomas L. Stoll
*Attorney, Agent, or Firm*—Myers Bigel Sibley & Sajovec

[57] ABSTRACT

Transceiver frequency and power level are allocated in a radio communications system which includes a base station, a radio personal communications terminal, and a radio personal communications network, by using a smart card to store frequency and power level indicators. The stored indicators are used to set personal communications terminal-to-base station communications. The smart card may be removably coupled to the base station or the personal communications terminal. Since the smart cards are issued by the radio personal communications system carrier, appropriate frequencies and power levels can be assigned for base stations, to minimize same channel interference with the radio personal communications network.

5 Claims, 6 Drawing Sheets

METHOD AND APPARATUS FOR CONTROLLING TRANSCEIVER OPERATIONS IN A RADIO COMMUNICATIONS SYSTEM TO REDUCE SAME CHANNEL FREQUENCY INTERFERENCE

This application is a continuation of application Ser. No. 08/093,076, filed Jul. 16, 1993, now abandoned.

FIELD OF THE INVENTION

This invention relates to communications systems and more particularly to radio communications systems.

BACKGROUND OF THE INVENTION

Radio communication systems are increasingly being used for wireless mobile communications. An example of a radio communication system is a cellular phone system. The design and operation of an analog cellular phone system is described in an article entitled *Advanced Mobile Phone Service* by Blecher, IEEE Transactions on Vehicular Technology, Vol. VT29, No. 2, May, 1980, pp. 238–244. The analog mobile cellular system is also referred to as the "AMPS" system.

Recently, digital cellular phone systems have also been proposed and implemented using a Time-Division Multiple Access (TDMA) architecture. Standards have also been set by the Electronics Industries Association (EIA) and the Telecommunications Industries Association (TIA) for an American Digital Cellular (ADC) architecture which is a dual mode analog and digital system following EIA/TIA document IS-54B. Telephones which implement the IS-54B dual mode architecture are presently being marketed by the assignee of the present invention.

Different standards have been promulgated for digital cellular phone systems in Europe. The European digital cellular system, also referred to as GSM, also uses a TDMA architecture. The GSM also uses a Subscriber Identification Module (SIM) which is removably coupled to a cellular phone in order to provide subscriber identification. The SIM is implemented using a "smart card", also referred to as a "chip card", which contains information such as a subscription number, telephone number and authentication codes in an embedded chip. The SIM can be exchanged between telephone units so that the user can insert the SIM into any compatible telephone. Cellular telephones using smart cards are also described in U.S. Pat. Nos. 5,091,942 to Dent; 5,134,717 to Soggard Rasumussen; and 5,153,919 to Reeds, III et al. Citizens band (CB) radios are also known, which use removable crystals to set oscillator frequency.

Proposals have recently been made to expand the cellular phone system into a radio personal communications system. The radio personal communications system provides mobile radio voice, digital, video and/or multimedia communications using radio personal communications terminals. Thus, any form of information may be sent and received. Radio personal communications terminals include a radio telephone, such as a cellular telephone, and may include other components for voice, digital, video and/or multimedia communications.

A radio personal communication system includes at least one base station. A base station is a low power transceiver which communicates with a radio personal communications terminal such as a cellular telephone over a limited distance, such as tens of meters, and is also electrically connected to the conventional wire network. The base station allows the owner of a radio personal communications terminal to directly access the wire network without passing through the radio personal communications network, such as the cellular phone network, whose access rates are typically more costly. When located outside the range of the base station, the personal communications terminal automatically communicates with the radio personal communications network at the prevailing access rates.

A major problem in implementing a radio personal communication system is the frequency overlap between the radio personal communications network (e.g., cellular phone network) and the base station. As understood by those having skill in the art, only a limited number of frequencies are available for radio communications. In the United States, cellular telephones have been allocated 832 30kHz wide channels. Within this spectrum, each regional provider can substantially allocate and use these frequencies as it sees fit.

In a radio personal communications system, it is assumed that base station transmission will be in the same frequency spectrum as the radio personal communications network. Accordingly, the possibility of same channel interference arises when a base station is operating at the same channel as the network covering the same area.

Frequency overlap between the network and the base stations can be prevented if the network and base stations are allocated different bands of frequencies. However, such a hybrid system is not an efficient allocation of the frequency spectrum. Moreover, a hybrid personal communications terminal may be more expensive and complicated because additional circuitry may be required. Accordingly, in order to efficiently provide a radio personal communications system, it is desirable to provide base stations which operate in the same frequency bands as the radio personal communications networks, while avoiding same channel interference.

SUMMARY OF THE INVENTION

It is therefore an object of the present invention to provide an improved radio personal communications system and method.

It is another object of the present invention to provide a radio personal communications system and method wherein same channel interference between the radio personal communications network, such as the cellular telephone network, and the base stations, are reduced.

These and other objects are obtained, according to the present invention, by providing frequency indicating means, preferably a smart card, for storing therein an indicator of at least one radio transmission frequency. The radio personal communications terminal and/or base station is adapted for removably coupling the frequency indicating means thereto and for controlling the radio personal communications terminal and/or base station to operate at a frequency corresponding to a frequency which is stored in the smart card. Since the smart cards are issued by the radio personal communications system carriers, appropriate frequencies can be assigned for the base stations, to minimize same channel interference with the radio personal communications network. Moreover, by allowing radio personal communications system carriers to lease unused frequencies via smart cards, additional revenue may be generated from these frequencies.

Preferably, according to the invention, the frequency indicating means (smart card) also stores therein a second indicator of at least one power level, and the radio personal communications terminal and/or base station operates at a frequency and power level corresponding to that which is stored in the smart card. The base station is preferably adapted for removably receiving the frequency and power level indicating means (smart card) and for controlling the transmission frequency and power of the base station to correspond to the stored frequency and power level. A stored frequency and power level are also preferably provided to the personal communications terminal which communicates with the base station, so that the terminal also transmits at a frequency and power level which is compatible with that of the base station.

Alternatively, the frequency and power level indicating means (smart card) may be contained within the radio personal communications terminal. Then, when establishing contact with the base station, the terminal can set the frequency and power level of the base station and of the terminal based on a power level and frequency stored in the smart card.

In a method according to the present invention, a base station for a radio telephone network is operated to reduce same channel interference with the radio telephone network by electrically connecting the base station to a wire telephone network and by receiving a frequency indicating signal, and also preferably a power level indicating signal, from a source external to the base station. The base station transceiver is then operated at a frequency, and preferably at a power level, corresponding to the received frequency and power level indicating signals. Preferably, the frequency and power level indicating signals are received by removably coupling a smart card, including a stored indication of at least one radio transmission frequency and power level, to the base station, and obtaining from the coupled smart card, signals representing the at least one radio transmission frequency and power level. The base station also preferably transmits a frequency and power level signal, based upon the stored indicators to a radio telephone with which it communicates, so that the radio telephone also can operate at a frequency and power level which is compatible with the base station.

In an alternate method, the radio telephone is adapted for removably coupling a smart card thereto, where the smart card includes at least one stored indication of the radio transmission frequency and preferably a power level. The radio telephone transceiver is controlled to operate at a frequency and power level corresponding to the stored frequency and power level in the smart card. The radio telephone also transmits signals representing a radio transmission frequency and preferably a power level, to the base station, so that the base station can operate at this power level.

The use of smart cards for storing frequency and power level indications allows the network operator to assign frequencies for base stations which minimize same channel interference with the radio network. The system carrier also can obtain additional revenue from unused frequencies within a network cell by leasing these frequencies for base station operation within the cell. An improved radio personal communications system and method is thereby provided.

DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1A:
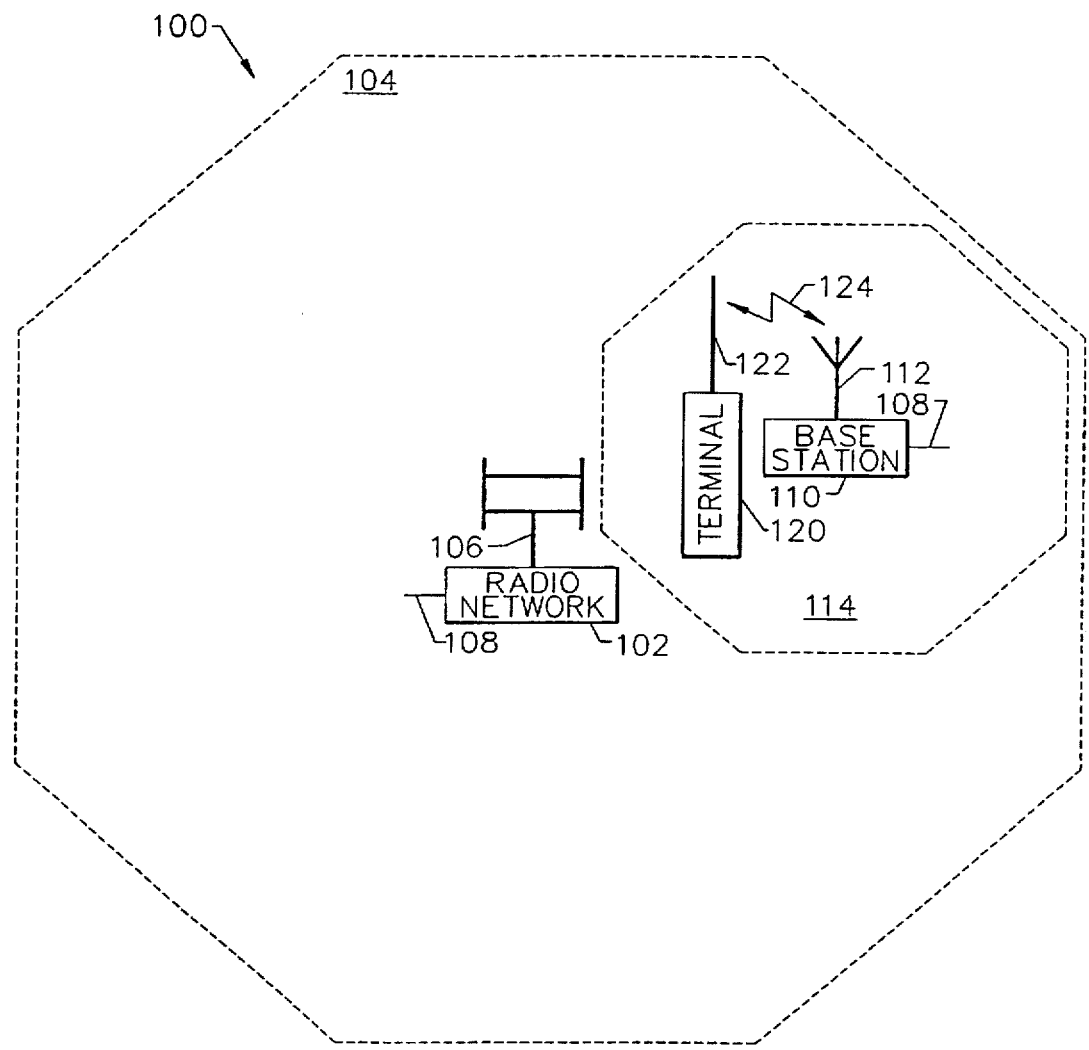
FIGS. 1A and 1B schematically illustrate a radio personal communication system including a base station and a radio personal communications terminal, with radio communications between the terminal and the base station, and radio communications between the terminal and a radio personal communications network, respectively.
Figure 1B:
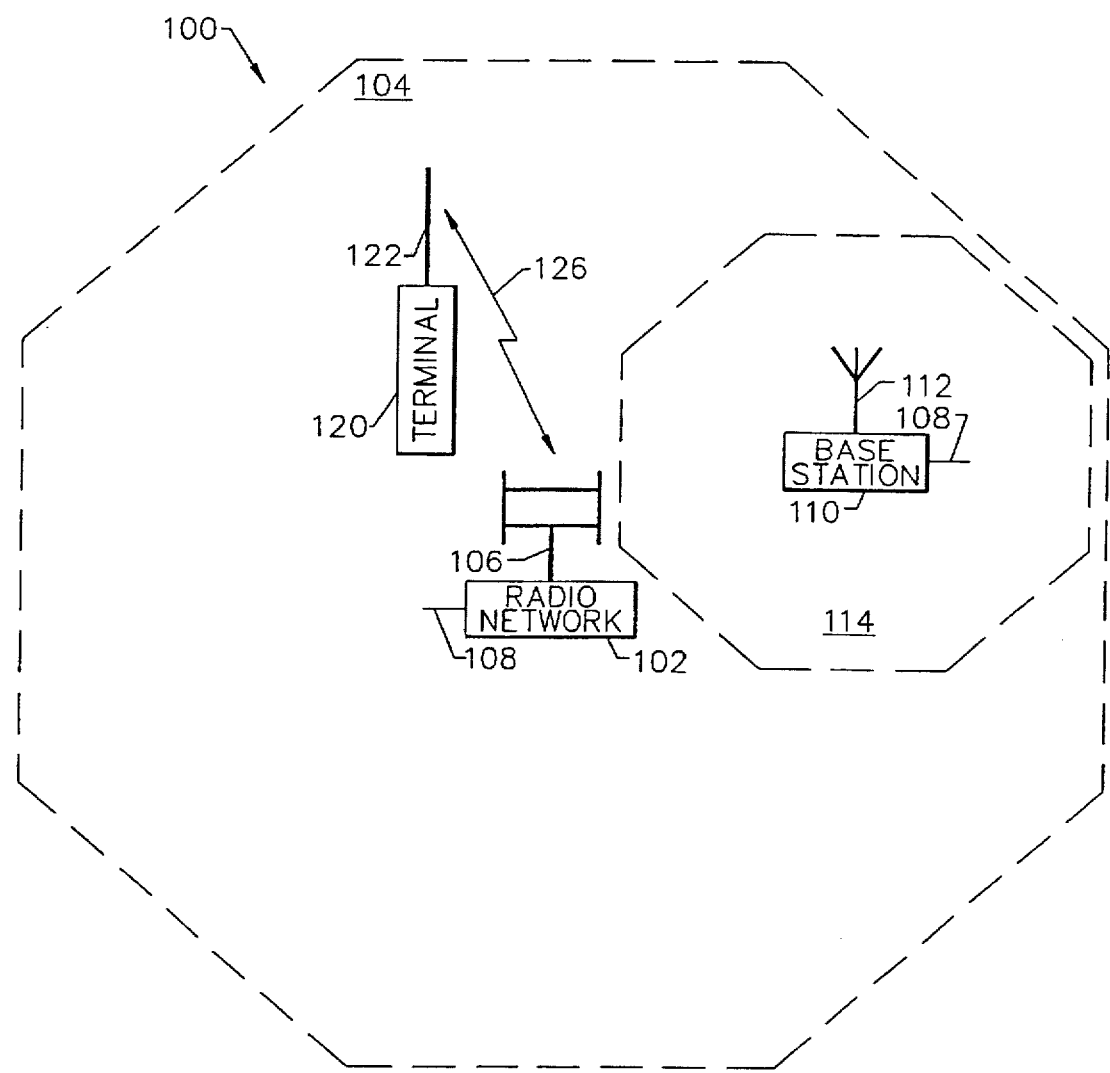

Referring now to FIGS. 1A and 1B, conceptual diagrams of a radio personal communications system are shown. As shown in FIG. 1A, radio personal communications system 100 includes at least one radio personal communications network 102, such as a cellular telephone cell, for transmitting and receiving messages in a network range indicated by 104, via cell antenna 106. Network 102 also interfaces with the wired network 108. It will be understood by those having skill in the art that a radio personal communication system 100 typically includes many radio personal communication networks, or cells, 102 to cover a large area.

Still referring to FIG. 1A, system 100 also includes a base station 110. Base station 110 includes a low power transceiver for transmitting and receiving via base station antenna 112, over a limited base station range 114, typically on the order of tens of meters. Thus, a base station may be used for transmission and receipt of radio personal communications in a home or office. Base station 110 also is electrically connected to the wire network 108.

Still referring to FIG. 1A, a radio personal communications terminal 120 is shown for radio communications with both base station 110 and network 102 via antenna 122. Radio personal communications terminal includes a radio telephone such as a cellular phone. Radio personal communications terminal 120 may also include, for example, a full computer keyboard and display, a scanner, and full graphics and multimedia capabilities.

As illustrated in FIG. 1A, when terminal 120 is in the range 114 of the base station 110, a radio link 124 therebetween is automatically established. As shown in FIG. 1B, when the terminal 120 is outside the range 114 of the base station 110, but within the range 104 of the network 102, a new radio link 126 is automatically established with the network 102. Thus, when the user is relatively close to the base station 110 (i.e. within the home or office), wireless communications take place with the base station so that the radio personal communications network 102, with its higher rate structure, is bypassed. When the user is relatively far from the base station 110, communications take place with the network 102.

It will be understood by those having skill in the art that a complete radio personal communications system 100 will typically include many base stations 110, terminals 120 and radio networks (cells) 102. It will be understood by those having skill in the art that conventional communications and handoff protocols may be used with the present invention, and need not be described further herein. For purposes of this description, it will be assumed that the spectrum allocation is the IS-54B cellular phone spectrum allocation which is illustrated in Table 1 below.

TABLE 1

| System | Bandwidth (MHz) | Number of Channels | Boundary Channel Number | Transmitter Center Frequency (MHz) MOBILE | BASE |
|---|---|---|---|---|---|
| Not Used |   | 1 |   | (824.010) | (869.010) |
| A" | 1 | 33 | 991 | 824.040 | 869.040 |
|   |   |   | 1023 | 825.000 | 870.000 |
| A | 10 | 333 | 1 | 825.030 | 870.030 |
|   |   |   | 333 | 834.990 | 879.990 |
| B | 10 | 333 | 334 | 835.020 | 880.020 |
|   |   |   | 666 | 844.980 | 889.980 |
| A' | 1.5 | 50 | 667 | 845.010 | 890.010 |
|   |   |   | 716 | 846.480 | 891.480 |
| B' | 1.5 | 83 | 717 | 846.510 | 891.510 |
|   |   |   | 799 | 848.970 | 893.970 |

| Transmitter | Channel Number | Center Frequency (MHz) |
|---|---|---|
| MOBILE | 1 ≦ N ≦ 799 | 0.030 N + 825.000 |
|   | 990 ≦ N ≦ 1023 | 0.030 (N-1023) + 825.000 |
| BASE | 1 ≦ N ≦ 799 | 0.030 N + 870.000 |
|   | 990 ≦ N ≦ 1023 | 0.030 (N-1023) + 870.000 |

In the radio personal communication system 100 described in FIGS. 1A and 1B, it is important to avoid same channel interference between base station 110 and network 102. According to the invention, the operator of network 102, which has been assigned the use of the frequency spectrum in the region by a regulatory authority, is allowed to assign frequencies and preferably power levels, of base station 110. The network operator can assign frequencies and preferably power levels to base station 110 to minimize same channel interference and to maximize revenue from the assigned frequency spectrum. Frequency indicating means, in the form of a smart card, removable memory module or other token, is removably coupled to the base station 110 or personal communications terminal 120 to provide frequency information, and also preferably power level information, which governs terminal-to-base station communications.

Figure 2:
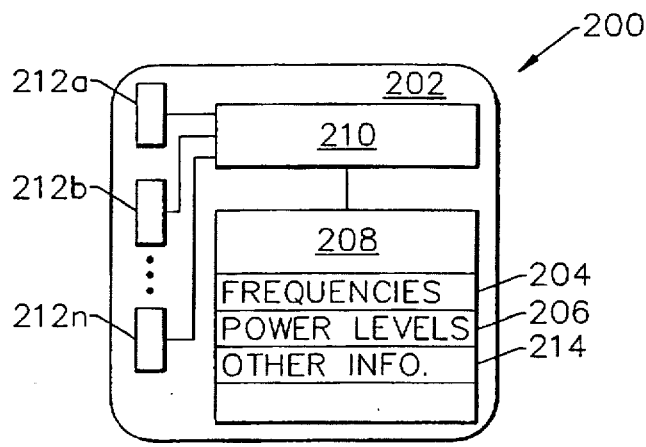
FIG. 2 is a schematic block diagram of frequency and power level indicating means according to the present invention.

FIG. 2 illustrates a frequency and power level indicating means according to the invention. As shown, frequency and power level indicating means 200 is preferably a smart card 202, also referred to as a "chip card", or other token, which includes memory means 208 for storing therein indications of at least one radio transmission frequency 204 and at least one power level 206. Memory 208 is preferably an electrically erasable programmable read only memory (EEPROM), which operates under control of a controller 210. A plurality of smart card electrical contacts 212a–212n, only three of which are illustrated in FIG. 2, allow communication of the frequency and power level indicators 204, 206 external to the smart card 202. It will be understood by those having skill in the art that memory 208 may also contain other information 214, for example identification information such as subscription number, telephone number and authentication codes, and/or other preprogrammed telephone numbers. A smart card is currently used in the European digital cellular system (GSM) for purposes of subscriber identification. The GSM smart card is referred to as a Subscriber Identification Module (SIM) and is described in International Standards ISO 7816-1, -2, and -3.

Figure 3:
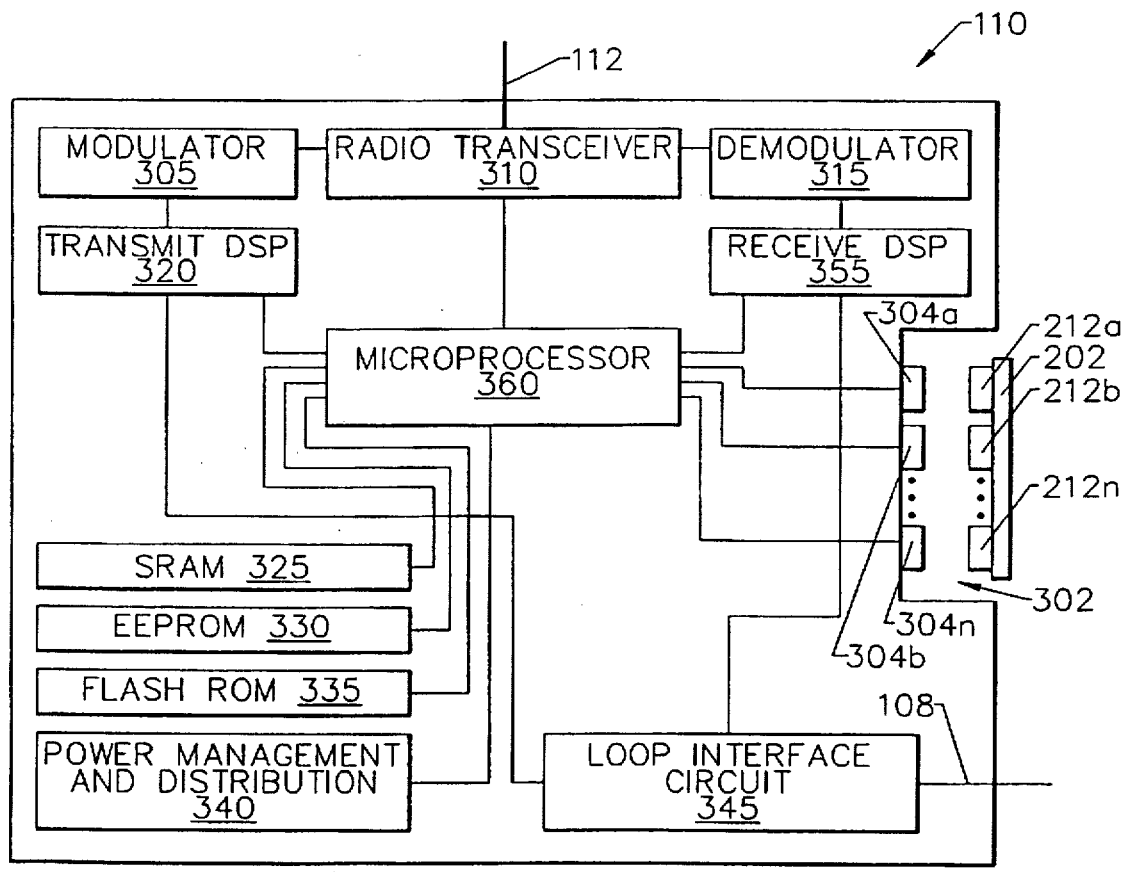
FIG. 3 is a schematic block diagram of a base station according to the present invention.

FIG. 3 illustrates a block diagram of a preferred embodiment of the present invention, in which a base station 110 includes means for removably coupling the frequency and power level indicating means 200 thereto. FIG. 3 illustrates a recess 302 for removably coupling the frequency and power level indicating means 200 to base station 110. However, other removable coupling arrangements may be provided. Contacts 212a–212n electrically contact corresponding base station contacts 304a–304n for obtaining signals representing the frequency and power level indications 204, 206 from smart card 202. It will be understood that electromagnetic, optical or other means may also be used to obtain the signals from the removably coupled smart card 202.

According to the invention, base station 110 uses the obtained frequency and power level 204, 206, respectively, to govern operation of base station 110. Frequency and power level signals are also preferably used to control operation of the radio personal communications terminal 120 as will be described below. As will also be described below the terminal 120 may be controlled to operate at the same frequency and power level as base station 110. Alternatively, a different frequency and power level may be provided. If a different frequency or power level is used, smart card 202 may store multiple frequencies 204 and power levels 206. Alternatively, the base station 110 or terminal 120 may determine the second frequency and power level from a single stored indication in smart card 202. The base station 110 is preferably configured so that it will not operate without a frequency and power level indicating means 200 coupled thereto. Thus, the network operator can receive revenue from the use of the frequency, and simultaneously prevent radio communications between base station 110 and terminal 120 from interfering with the cellular network.

Referring again to FIG. 3, the remaining circuitry of base station 110 will now be described. The design of the remaining circuitry of base station 110 is well known to those having skill in the art, and need not be described in detail. Microprocessor 360, for example a Zilog Z80 microcontroller, controls the base station 110. Radio transceiver 310 provides two-way communications with the terminal 120 and network 102 via antenna 112. Signals received by antenna 112 are down converted by the radio transceiver 310, and provided to a demodulator 315. The demodulator produces a bit stream, i.e. a sequence of binary data representing the received data. The bit stream is then provided to the receive digital signal processor (DSP) 355, where it is converted to an analog audio signal according to methods well known to those having skill in the art. The resultant analog signal is transferred to the subscriber loop interface circuit 345. Loop interface circuit 345 is a commonly used circuit which provides the interface to the wired network 108, also referred to as the Public Switched Telephone Network (PSTN). PSTN 108 is the regular "wire line" telephone system supplied by, for example, the regional Bell Operating Companies, and may use copper wire, optical fiber or other stationary transmission channels.

Still referring to FIG. 3, receive DSP 355 is controlled by microprocessor 360. Microprocessor 360 provides timing signals and instructions. Operating instructions for the receive DSP 355 are typically contained in electrically erasable programmable read-only memory (EEPROM) 330. Flash ROM 335 typically contains instructions for the microprocessor 360 itself. These instructions are uploaded into the microprocessor 360 during initialization. SRAM 325 is a static random access memory which is typically used by the DSP 355 and the microprocessor 360 as a scratch pad memory for temporary storage of information. Power management and distribution circuits 340 are also connected to microprocessor 360.

To transmit, signals received from wire network 108 are coupled to the transmit DSP 320 by a loop interface circuit 345. The transmit DSP 320 digitizes the analog signal and converts it into a bit stream which is then passed onto the modulator 305. The transmit circuits basically perform complementary functions to those already described for the receive circuits.

Figure 4:
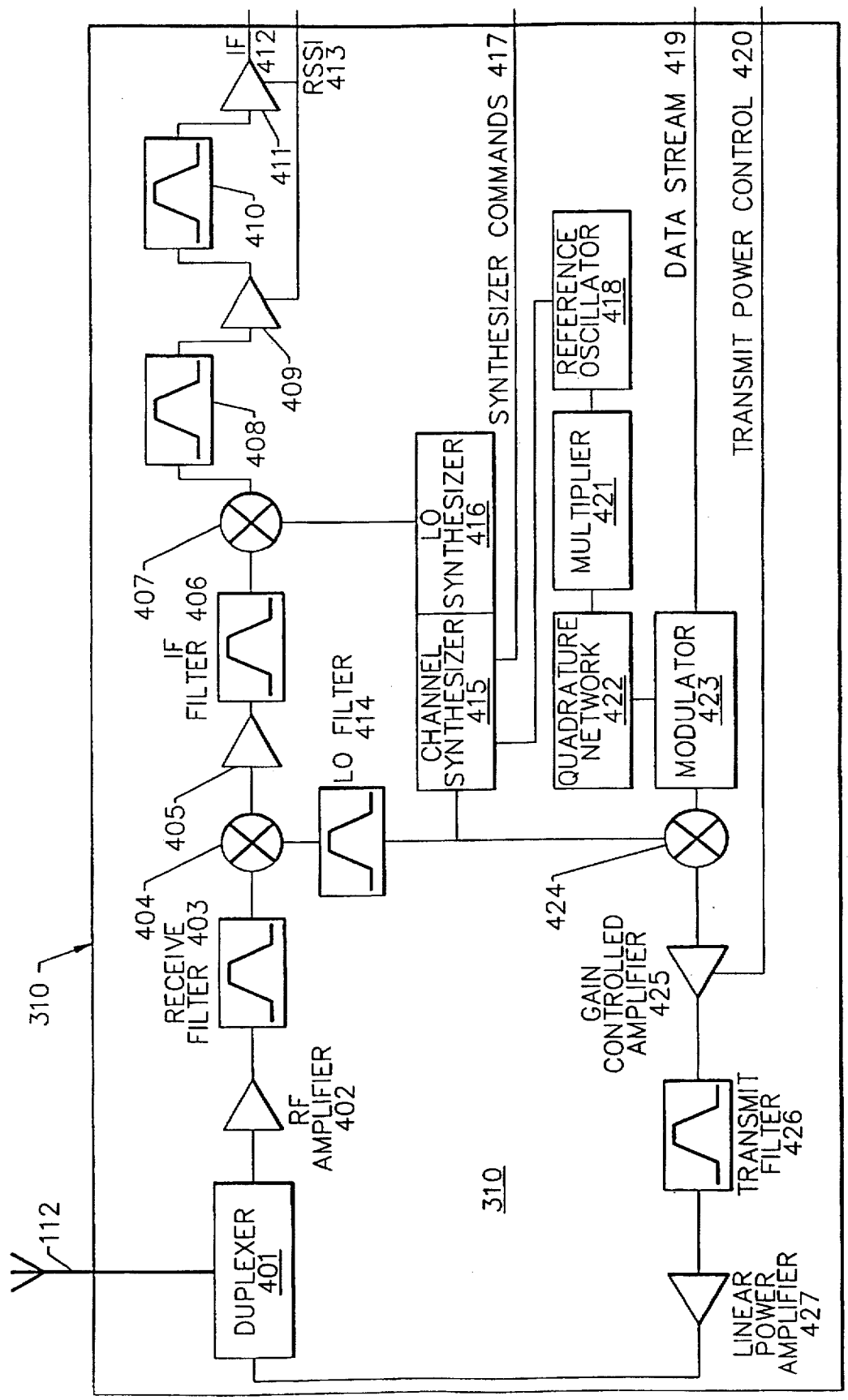
FIG. 4 is a schematic block diagram of a base station radio frequency transceiver according to the present invention.

FIG. 4 illustrates a schematic block diagram of a radio transceiver 310 of FIG. 3. As shown, transceiver 310 includes circuitry for both the reception and transmission of the radio frequency signals. Signals received by the antenna 112 are directed to the receive circuits by the duplexer 401. The duplexer is a filter with two separate bandpass responses: one for passing signals in the receive band and another for passing signals in the transmit band. In the ADC architecture, described above, the receive and transmit frequencies are separated by 45 mHz. The duplexer 401 allows simultaneous transmission and reception of signals.

After passing through the duplexer 401, received signals are amplified by a low noise radio frequency (RF) amplifier 402. This amplifier provides just enough gain to overcome the expected losses in the front end circuitry. After amplification, unwanted components of the signal are filtered out by the receive filter 403. After filtering, the signal is mixed down to a first intermediate frequency (IF) by mixing it in mixer 404 with a second signal generated by the channel synthesizer 415 and filtered by Local Oscillator (LO) filter 414. The first IF signal is then amplified by amplifier 405 and unwanted mixing products are removed by IF filter 406. After filtering, the first IF is mixed in mixer 407 to yet another lower frequency or second IF signal, using a signal provided by local oscillator synthesizer 416. The second IF signal is then filtered by two filters 408 and 410, and amplified by multistage amplifiers 409 and 411 to obtain an IF signal 412 and a radio signal strength indication (RSSI) signal 413. Thereafter, it undergoes a process of detection, for example, as described in U.S. Pat. No. 5,048,059 to Dent, the disclosure of which is incorporated herein by reference.

In order to transmit, a datastream 419 is generated by the transmit DSP 320 (FIG. 3). In ADC architecture, the datastream is organized as bursts for time division multiplexing with other users. Reference oscillator 418 generates a precise frequency which is used as a stable reference for the RF circuits. The output of oscillator 418 is passed through a multiplier 421 where it experiences a sixfold increase in frequency. This frequency is then passed into a quadrature network 422 which produces two signals of equal amplitude which have a quadrature phase relationship, i.e. they are offset by 90°. These quadrature signals, along with the datastream 419, are combined in the modulator 423 to create a modulated signal, as described in an article entitled I and Q *Modulators for Cellular Communications Systems*, D. E. Norton et al., Microwave Journal, Vol. 34, No. 10, October 1991, pp. 63–79. The modulated signal is passed to a mixer 424 which translates the signal to radio frequency. The exact radio frequency is determined by the local oscillator signal provided by the channel synthesizer 415. The radio frequency signal is passed through a variable gain controlled amplifier 425. The gain of this amplifier, which is controlled by means of a voltage on transmit power control line 420, determines the eventual output power, since the linear power amplifier 427 has fixed gain. Filtering is performed by transmit filter 426.

According to the invention, a frequency indicator 204 stored in smart card 202 is converted to a synthesizer command and applied to line 417 to produce the requisite transmit and receive frequency. A power level indicator 206 stored in smart card 202 is converted to a transmit power control signal and applied to line 420 to control the transmit power. The conversions are preferably performed by microprocessor 360 using conventional techniques. Operations performed to set the frequency and power level will be described below in connection with FIG. 6.

Figure 5:
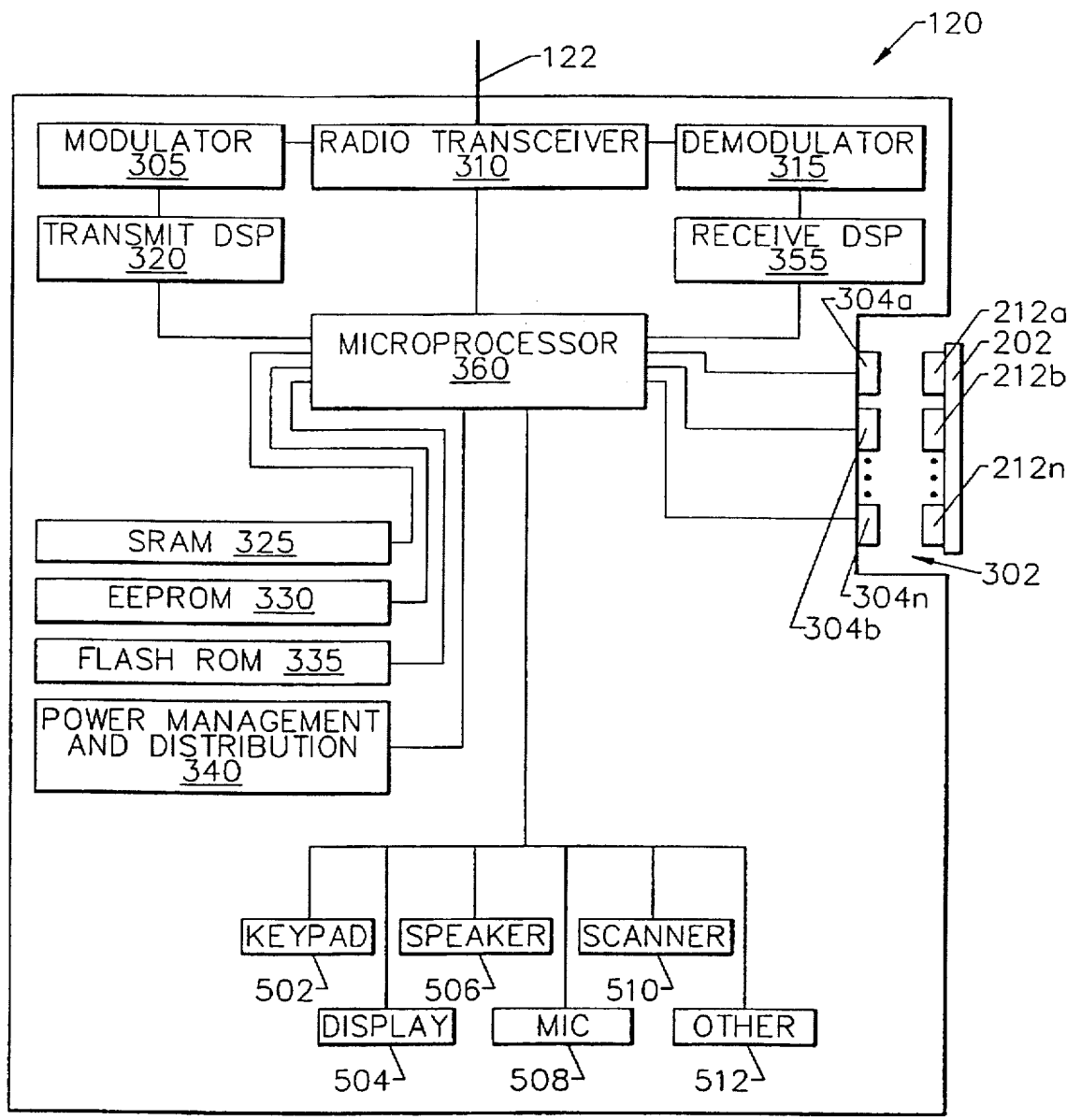
FIG. 5 is a schematic block diagram of a radio personal communications terminal according to the present invention.

Referring now to FIG. 5, according to another embodiment of the invention, frequency and power level indicating means 200 can also be used in radio personal communications terminal 120 to control the frequency and power level thereof and/or to control the frequency and power level of base station 110 by radio transmission. The design of terminal 120 is similar to that of base station 110 (FIG. 3) except that a loop interface circuit 345 is not present. When terminal 120 is a cellular phone, it includes a keypad 502, a display 504, a speaker 506, and a microphone 508. In order to provide a radio personal communications terminal for receipt and transmission of audio, video and data and/or multimedia signals, keypad 502 may be a full scale personal computer keyboard and display 504 may be a large graphics display. A scanner 510 may also be provided as may other devices 512 such as disk drives and modems. Apart from the use of smart card 200 for setting power levels and frequencies, the design of terminal 120 is well known to those having skill in the art and need not be described herein.

Figure 6:
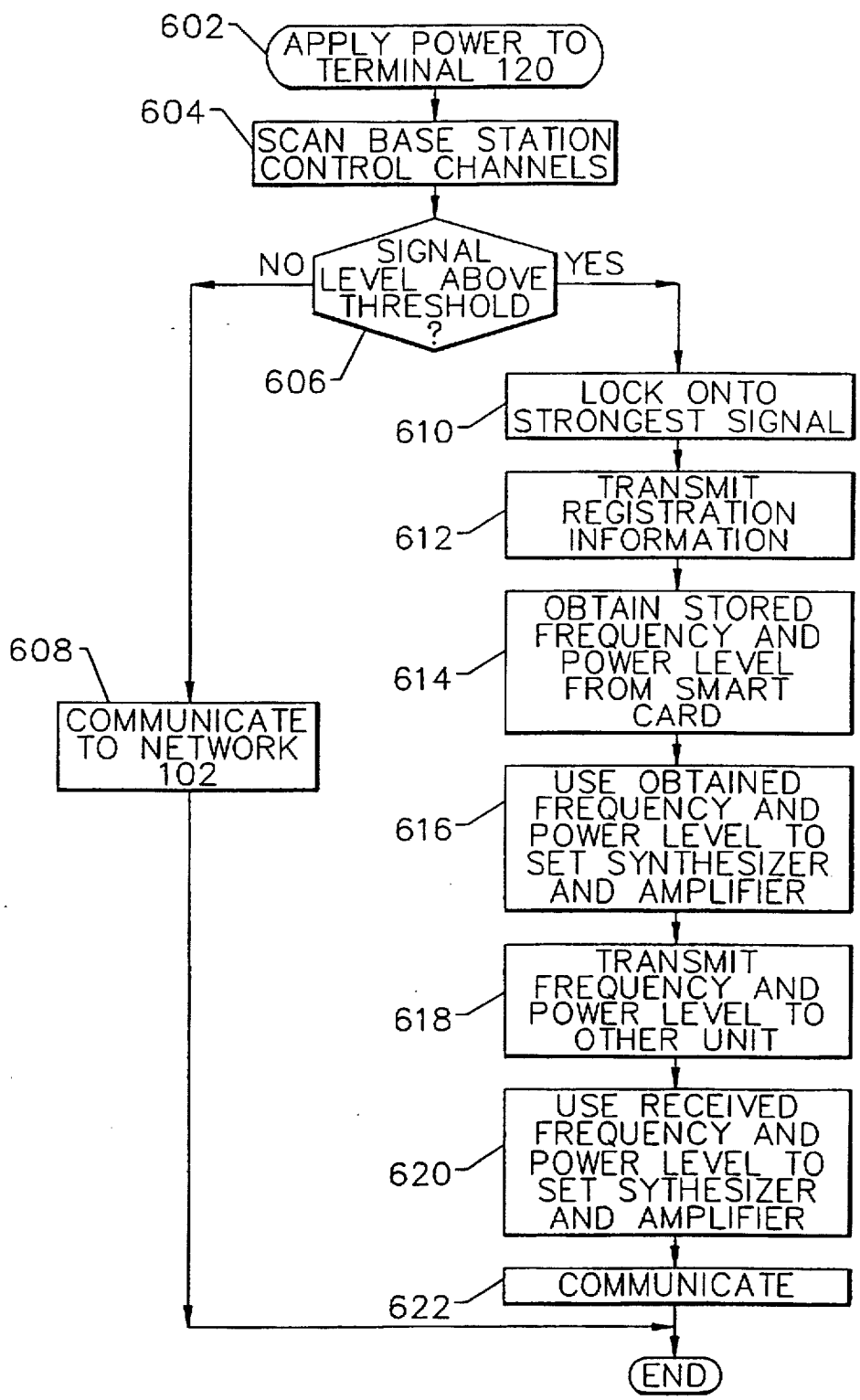
FIG. 6 is a flowchart illustrating operations of a radio personal communication system according to the present invention.

Referring now to FIG. 6, operations for controlling frequency and power level of a personal communications terminal and/or a base station, based upon stored frequency and power level information from a smart card, according to the invention, will now be displayed. It will be understood that other operations may be used.

Operations begin when power is applied to terminal 120 at Block 602. Upon application of power, the terminal 120 scans a set of control channels which are allocated to base stations 110, and determines if a signal level above threshold has been detected, at Block 606. It will be understood that each base station 110 is typically allocated only one of the set of control channels. If a signal level above threshold has been detected, then terminal 120 is within the range 114 of base station 110. If a signal level above threshold was not detected, then the terminal 120 is not within the range of base station 110 and communications are initiated with network 102 at Block 608, using conventional techniques.

Referring again to Block 606, if a base station control channel signal above threshold is detected, the terminal 120 locks onto the strongest signal at Block 610. Once locked on, terminal 120 performs a registration at Block 612. Similar to cellular phone systems, this registration information occurs at a predetermined power level and a predetermined frequency which depends upon the control channel which has been locked.

During the registration process, the base station 110 instructs the terminal 120 to tune to another frequency, to which the base station opens a channel and transmits at a defined power level. This can be the same frequency and power level which is determined by the frequency and power level indicators, or can be a different frequency and power level. Once the transfer has been completed, the base station drops the control channel frequency to prevent another user from attempting to use the same base station.

According to the invention, the stored frequency and power level indicators are obtained from the smart card 202 which is preferably removably coupled to the base station 110, but which may also be removably coupled to the terminal 120. At Block 616, the obtained frequency and power levels are converted to signals which are used to set the synthesizer 415 and amplifier 425 for the unit which is removably coupled to the smart card. Signals representing a frequency and power level (the same frequency/power level or different frequency/power level) are then transmitted to the other unit, which does not contain the smart card, at Block 618. That unit uses the received frequency and power level signals to set its synthesizer and amplifier at Block 620. Communications then take place between the base station 110 and terminal 120 at the frequencies and power levels which were set in the earlier operations, at Block 622.

It will be understood by those having skill in the art that a separate voice channel frequency and power level may be stored in the smart card 202 for the base station 110 and terminal 120. The power levels may be different for the base station and the terminal if, for example, the base station has a larger antenna or a more sensitive receiver. It is also contemplated that the frequencies will be different since the terminal and base station would not typically transmit or receive on the same frequencies in a duplex transceiver. Alternatively, a single frequency and power level may be stored and a second frequency and power level may be determined from the single frequency and power level.

Accordingly, the network provider can use a frequency and power level indicating means such as a smart card, to allocate frequencies and power levels of base station-to-terminal communications. By allocating the frequency and power level of base station-to-terminal communications, same frequency interference within a network cell is reduced and the network provider obtains additional revenue from the licensed frequency spectrum for the base station.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A radio personal communications system comprising:
   a cellular network including a plurality of cells, each of which communicates over a set of assigned frequencies;
   a radio personal communications terminal including first radio transceiving means;
   a portable base station, electrically connected to a wire telephone network, and including second radio transceiving means for communicating with said first radio transceiving means, said base station being located within a first one of said plurality of cells having a first set of assigned frequencies, said base station including a smart card coupling interface; and
   a smart card configured to removably couple to said base station, located within said first one of said plurality of cells, said smart card including:
      interface means for electrically connecting said smart card to said smart card coupling interface of said portable base station;
      memory means for storing indications of at least one radio transmission frequency and power level, said at least one radio transmission frequency being selected from said sets of frequencies assigned to the plurality of cells in the cellular network and being different from said first set of assigned frequencies; and
      a controller operatively connected to said interface means of said smart card for providing said at least one radio transmission frequency and said power level to said portable based station;
   said base station further comprising:
      means for obtaining from the smart card signals representing said at least one radio transmission frequency and power level, said at least one radio transmission frequency being selected from said sets of frequencies assigned to the plurality of cells in the cellular network and being different from said first set of assigned frequencies; and
      means for controlling said second transceiving means to operate at a frequency and a power level corresponding to the at least one radio transmission frequency and power level, said at least one radio transmission frequency being selected from said sets of frequencies assigned to the plurality of cells in the cellular network and being different from said first set of assigned frequencies, such that frequency interference between said second radio transceiving means and said cellular network is reduced.

2. The radio personal communications system of claim 1 further comprising a radio personal communications network, wherein said radio personal communications terminal further comprises:
   means for controlling said first transceiving means to communicate with said base station when said radio personal communications terminal is relatively close to said base station, and for controlling said first transceiving means to communicate with said radio personal communications network when said radio personal communications terminal is relatively far from said base station, said first transceiving means operating at a frequency selected from said sets of frequencies assigned to the plurality of cells in the cellular network and which is different from said first set of assigned frequencies, such that frequency interference between said first transceiving means and said cellular network is reduced.

3. The radio communications system of claim 1 wherein said radio personal communications terminal comprises a radio telephone.

4. The radio personal communications system of claim 3 wherein said radio telephone is a cellular telephone.

5. A portable base station for a cellular network including a plurality of cells, each of which communicates over a set of assigned frequencies comprising:
   means for electrically connecting said portable base station to a wire telephone network, said portable base station being located within a first one of said plurality of cells having a first set of assigned frequencies;
   radio transceiving means;
   a smart card coupling interface having an access opening on an exterior surface of said portable base station;
   a smart card configured to removably couple to said smart card coupling interface, said smart card including:
      interface means for electrically connecting said smart card to said smart card coupling interface of said portable base station;

memory means for storing indications of at least one radio transmission frequency and power level, said at least one radio transmission frequency being selected from said sets of frequencies assigned to the plurality of cells in the cellular network and being different from said first set of assigned frequencies;

a controller operatively connected to said interface means of said smart card for providing said at least one radio transmission frequency and said power level to said portable base station;

said portable base station further comprising:

means for obtaining from said smart card signals representing said at least one radio transmission frequency and power level; and means, responsive to said signals representing said at least one radio transmission frequency and power level, for operating said transceiving means at a frequency corresponding to the obtained radio transmission frequency signal and at a power level corresponding to the obtained power level signal, said frequency being selected from said sets of frequencies assigned to the plurality of cells in the cellular network and being different from said first set of assigned frequencies, such that frequency interference between said transceiving means and said cellular network is reduced.

* * * * *